United States Patent [19]
Coja et al.

[11] Patent Number: 5,066,203
[45] Date of Patent: Nov. 19, 1991

[54] APPARATUS FOR PNEUMATICALLY DISCHARGING CONCRETE

[75] Inventors: Joachim Coja, Gelsenkirchen-Buer; Karl-Ernst von Eckardstein, Unna; Andre j. Simnovec, Recklinghausen, all of Fed. Rep. of Germany

[73] Assignee: Friedrich Wilh. Schwing GmbH, Herne, Fed. Rep. of Germany

[21] Appl. No.: 644,478

[22] Filed: Jan. 18, 1991

Related U.S. Application Data

[63] Continuation of Ser. No. 423,109, Oct. 18, 1989, abandoned.

[30] Foreign Application Priority Data

Oct. 18, 1988 [DE] Fed. Rep. of Germany ....... 3835373
Aug. 18, 1989 [DE] Fed. Rep. of Germany ....... 3927332

[51] Int. Cl.[5] ........................ F04B 9/10; F04B 35/02; G05D 11/00

[52] U.S. Cl. .................................. 417/318; 417/342; 417/900; 137/99

[58] Field of Search ...................... 417/318, 342, 900; 137/99

[56] References Cited

U.S. PATENT DOCUMENTS

| | | | |
|---|---|---|---|
| 2,289,332 | 7/1942 | Booth | 137/99 |
| 3,527,213 | 9/1970 | Schrieber | 137/99 |
| 3,733,965 | 5/1973 | Keine . | |
| 4,105,373 | 8/1978 | Calzolari | 417/900 |
| 4,293,227 | 10/1981 | Tanaka et al. | 366/11 |
| 4,529,000 | 7/1985 | Funk | 137/99 |
| 4,804,563 | 2/1989 | Hillemeier et al. | 427/397.7 |
| 4,824,022 | 4/1989 | Hillemeier et al. | 366/3 |

FOREIGN PATENT DOCUMENTS

A-2169992 9/1973 France .

*Primary Examiner*—Richard A. Bertsch
*Assistant Examiner*—John A. Savio, III
*Attorney, Agent, or Firm*—Kinney & Lange

[57] ABSTRACT

In an apparatus for pneumatically discharging concrete fed hydromechanically in a dense stream, using for the hydromechanical feed a concrete pump having a hydraulic drive comprising at least two cylinders with opposed pistons, said pump having synchronization control by a displacer circuit conducting the working medium displaced by a piston, and having a dosing means for an additive serving as an accelerating agent, whose drive is connected to the hydraulic circuit of the concrete pump drive, the inventive proposal is that the drive of the dosing means is connected to the displacer circuit and designed as a reciprocating piston drive whose absorption amount corresponds to the displacement amount of the working pistons and is added in both directions to the displacement amount of each working piston.

8 Claims, 2 Drawing Sheets

1
2
3
4
5
6
7
8
9
10
11
12
13
14
15
16
17
18
19
20
21
22
23
24
25
26
27
28
29
30
31
32
33
34
35
36
37
38
39
40
41
42
43
44
45
46
47
48
49
50
51
52
53
54
55
56
57
58
59
72
73
74
75
76
77

APPARATUS FOR PNEUMATICALLY DISCHARGING CONCRETE

This is a continuation of application Ser. No. 07/423,109 filed on Oct. 18, 1989, abandoned as of the date of this application.

The present invention relates to an apparatus for pneumatically discharging concrete fed hydromechanically in a dense stream.

This allows concrete mixed ready for use to be air-placed so as to ensure constant strengths of the building material while keeping to a predetermined water-cement ratio and with low energy consumption for the delivery air and the hydromechanical feed. Due to the accelerating admixture, the rebound losses are extremely low. By contrast with the pneumatic delivery of dry or moistened building material, there is virtually no dust formation from the building material. Dense stream feed allows for the discharge of large deliveries of concrete, as are required for example in tunnelling and gallery driving and in stabilizing excavation slopes or similar constructions.

The use of concrete pumps for air-placing concrete mixed ready for use allows for the use of well tried constructions which are long-wearing and require little maintenance. These are generally two-cylinder reciprocating pumps which, due to their hydraulic drive, permit the desired large deliveries and regulation of the particular amount of building material discharged. For example, the delivery can range from 4 cbm/h to 19 cbm/h. Concrete pumps of this kind are capable of hydromechanically feeding concrete of rigid consistency to the spraying means, which is a precondition for high strengths of the air-placed concrete.

The accelerating admixture must be added in a predetermined amount to the particular amount of concrete delivered and is usually liquid; it is e.g., water glass. Due to the pneumatic feed of the accelerating admixture, the latter can be added to the dense stream of concrete in atomized form. This makes it possible to allow extremely small amounts of accelerating admixture to take effect in the concrete. The atomization of the accelerating admixture into the delivery air can be effected by atomizer nozzles before the delivery air is added to the dense stream of concrete. By connecting the drive of the dosing means (mainly consisting of a pump) to the hydraulic circuit of the concrete pump drive, one obtains control of the delivered amounts of accelerating admixture, whose command variable is the particular amount of hydraulic medium that has passed through the concrete pump device, so that when the particular amount of concrete is delivered the amounts of additive are also added in accordance with the setting, which involves a certain ratio of delivery of concrete and accelerating admixture.

This kind of control is preferable to manual regulation of the amount of additive because it functions automatically, i.e., without the intervention of a human hand which must guide the mouthpiece from which the concrete emerges in the form of a broken spray jet. This will be dependent on an observation of the setting behavior of the discharged concrete, and on the particular worker's visual estimate and speed of response.

The invention therefore assumes a known apparatus with automatic control of the amounts of accelerating additive, which are added to the dense stream at every moment of concrete feed. The setting is adjustable. The accelerator is fed by a gear pump which derives its kinetic energy from a drive connected to the pressure medium pipe of the concrete pump directly behind the pressure generator and consists of a hydraulic motor. This hydraulic motor acts on the gear pump via a control gear. A valve is built into the feed pipe conducting the accelerator, said valve being activated, on the one hand, via hydraulic end position pulses of the drive pistons in the working cylinders of the concrete pump and, on the other hand, by a hydraulic working cylinder serving as the drive for the building material slide which bypasses the feed cylinders. This valve opens up the path for the fed accelerator back into the supply tank, thereby preventing the accelerator from entering the mouthpiece in the phases of the concrete pump when it is not feeding building material.

However, the known apparatus does not work perfectly. This is due mainly to the described components of the dosing means. The described control gear is often handled incorrectly, in particular when it is operating at a standstill, and reacts with disorders and damage. On the gear pump which feeds the accelerator, high leakage occurs in the low speed range due to the construction, so that the proportionality of the amounts is no longer ensured. The arrangement of the hydraulic gear pump drive necessitates the described valve, because pressure medium is also fed in the phases in which no building material is fed.

The invention is based on the problem of ensuring reliable dosing of the accelerating additive in an apparatus with the general design described at the outset. This problem is solvent with the features of the instant invention.

The invention disposes the drive of the dosing means at a place in the hydraulic working circuit of the concrete pump where there is constant volume measurements off of the working cylinder space takes place out of which the hydraulic working medium is displaced by the drive piston. This ensures that the drive of the dosing means provides kinetic energy only when the pump cylinder is working, i.e., when building material is actually being fed. Since the absorption amounts of the hydraulic medium in the reciprocating piston drive of the dosing means is added to the amount of medium flowing in the displacer circuit, the synchronization function of the working pistons of the concrete pump is unchanged but the deflection of the dosing means drive corresponds to the position of the drive pistons in every phase of feed. One can therefore dispense with a complicated control gear in spite of the simplification resulting from the reciprocating piston drive of the dosing means.

Preferably and, the invention makes use of the possibilities opened up by a linear piston drive, which can be provided for the dosing means. This is a drive cylinder for the linear-motion piston which works on a piston rod extending out of both cylinder covers. Thus, the absorption amount is the same in both directions of piston stroke, and the same absorption amounts can therefore be taken up regardless of the piston stroke direction.

Such a linear piston drive can also be used in a simple manner to replace the gear pump by a more expedient dosing means. The drive of the dosing means and its pump are of the same system, resulting in a simple connection of both means.

In particular in this embodiment of the invention, the features of claim 4 allow a mechanical linkage to be used between the means of the same system for firmly adjusting the amounts of additive to be used for the particular concrete. This is done via a rocker arm to which one of the two means of the same system is connected with an adjustable slide.

Up to now it was also impossible to take account of the volumetric efficiency of the concrete feed when dosing the additive. The volumetric efficiency is contingent on the compressibility of the concrete, which is in turn a consequence of the inclusions of air which cannot be avoided in concrete. Thus, a delivery of concrete is simulated during the forward stroke of the concrete pump piston until the compressibility of the cylinder filling is exhausted. If this were not taken into account, it would again result in a dosing error having an adverse effect on the quality of the concrete.

This problem is solved by further features of the invention. If one opens up the feed of additive with the directional control valve only when a minimum pressure is reached in the displacer circuit of the working medium of the concrete pump but otherwise allows the additive to flow back into the tank, one takes account of the pressure increase in the feed cylinder which precedes the movement of the column of concrete. This prevents additive from emerging in atomized form from the building material outlet of the spraying means, that is not only in excess but also dries out the concrete already applied when hitting it, and furthermore endangers persons in the vicinity.

Most additives which are used as accelerators tend to cake on the parts they come in contact with. This has an adverse effect in particular on the walls of the cylinders which feed the additive. It is therefore expedient to realize additional features of the invention, as this results in a constant rinsing and thus dilution of the additive with water where there is a danger of caking.

The invention shall be explained in more detail in the following with reference to two exemplary embodiments shown schematically in the drawing.

DETAILED DESCRIPTION OF THE DRAWINGS

Figure 1:
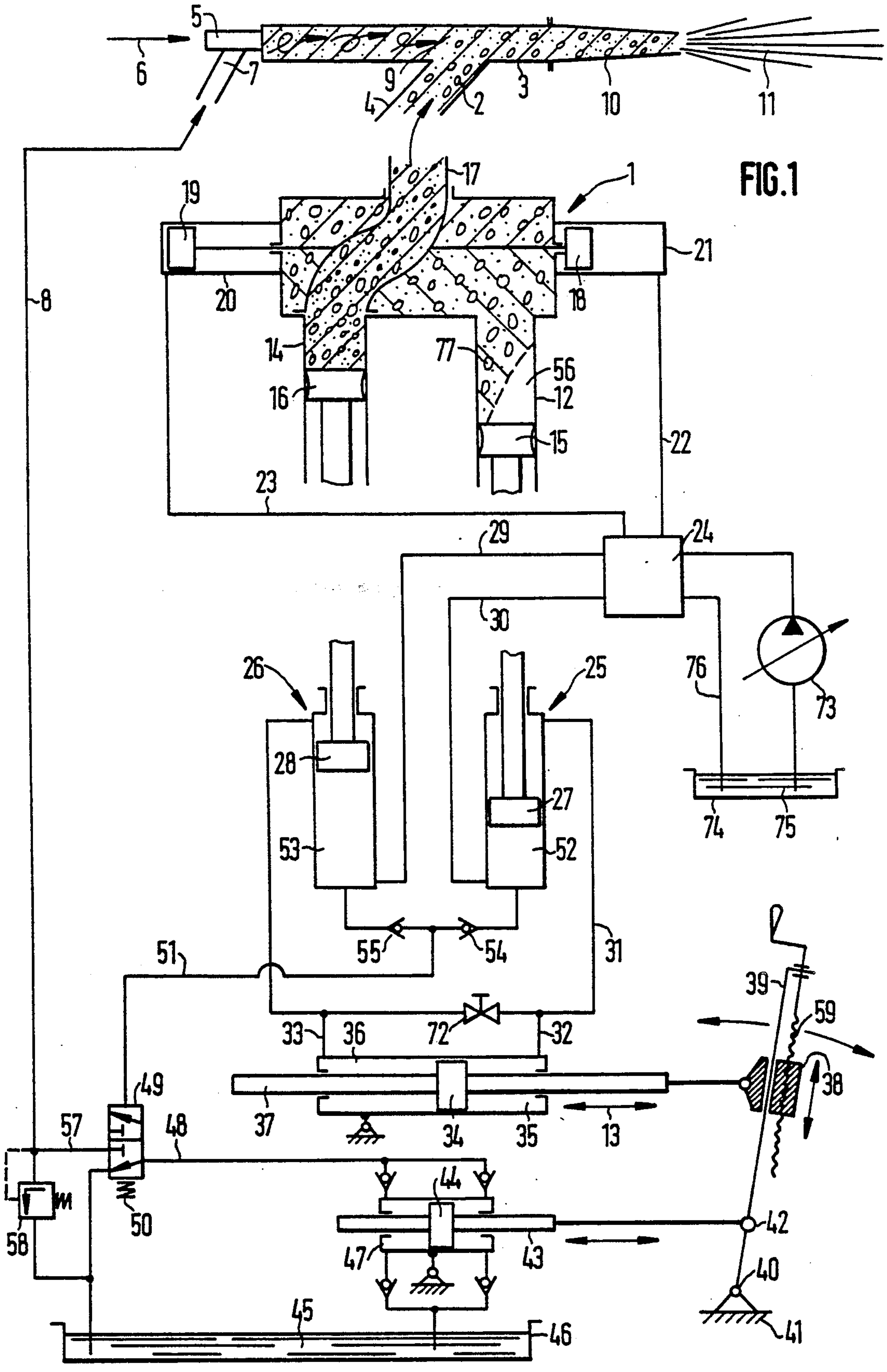
FIG. 1 shows a first embodiment of the invention, rendering the concrete pump and the spraying means.

Concrete pump I known as such and shown in FIG. 1 only with its essential parts feeds concrete 2 in a dense stream into a nozzle pipe 3 through a tube connection 4. Nozzle pipe 3 penetrates a pipe cover and ends on a spray nozzle 5. Compressed air is fed in the direction of arrow 6, carrying along the atomized additive. The additive reaches the nozzle from a pipe 8 through a nipple 7. The additive atomized by the nozzle is suspended in the delivery air when the latter hits at 9 the dense stream of concrete 2, which is thereby broken up and emerges from nozzle 10 of pipe 3 under pressure in a broken jet 11.

Concrete pump 1 delivers the concrete with two feed cylinders 12, 14 with the aid of pistons 15, 16 which reciprocally suck the concrete (piston 15) and press it out through a swing pipe 17 (piston 16). The swing, pipe connects the two cylinders 12, 14 with the feed pipe and is reversed in the end position of the particular piston. This is effected hydraulically with pistons 18, !9 in working cylinders 20, 21 which are subjected to hydraulic pressure medium from pipes 22, 23. The control is seated in a block 24.

To drive pistons 15 and 16 via the piston rods thereof, one uses hydraulic working cylinders 25, 26 in which drive pistons 27, 28 reciprocate. The medium attacks on the full piston side from the two pipes 29, 30 which are reversed with control 24. The synchronization of pistons 27 and 28 is ensured by a displacer circuit 31 which is connected to working cylinders 25, 26 on the piston rod side. The displacer circuit thus contains the hydraulic working medium displaced by an advancing drive piston 27, 28 from the cylinder involved 25, 26 and feeds it to the adjacent piston.

The two pipes 32, 33 branch off from displacer circuit 31 to apply hydraulic pressure medium to cylinder spaces 35, 36 separated from each other by a linear piston 34, said medium being added to the particular amount displaced. Piston rod 37 connected with displacer piston 34 ensures cylinder spaces 35, 36 of equal volume, thereby ensuring the reciprocating movement of the displacer piston in both directions following arrow 13.

Piston rod 37 is connected with an adjustable slide 38 to a rocker arm 39 whose hinge 40 stationary on the frame is shown at 41. Between slide 38 and hinge 40 there is hinge 42, stationary on the rocker, of a piston rod 43 of a further linear piston 44. The latter serves to feed liquid accelerating additive 45 from a tank 46. Feed cylinder 47 is subjected to medium on both sides through legs which are provided with check valves. They are matched by branches with check valves of feed pipe 48 which leads to a directional control valve 49. The directional valve is loaded on one side with a pull-back spring 50 and subjected to medium on the other side via a pipe 51 which conveys the particular pressure in piston spaces 52, 53 of working cylinders 25, 26. Check valves 54, 55 in the branches of pipe 51 prevent hydraulic working medium from passing from one to the other of cylinder spaces 52, 53.

Hydraulic pressure generator 73 for hydraulic working medium 75 of concrete pump 1 held ready in a tank 74 is installed before control 24 which also influences a return pipe 76.

In the shown position of directional valve 49, the feed of additive extends from tank 46 through cylinder 47 back into tank 46, assuming that a total space 56 in concrete feed cylinder 12 is compressible. As soon as column 77 of concrete located in feed cylinder 12 has started moving, the pressure rises in cylinder space 52 far enough to open check valve 54 and act on directional valve 49, causing spring 50 to give way and open the path on the additive into pipe 8 via branch 57, whereby valve 58 defines a minimum pressure in pipe 8. In this case, the accelerator is fed through pipe 8 and connection 7 to spray nozzle 5 and atomized with delivery air 6. At the same time, concrete is fed through connection 2 of nozzle pipe 3.

The adjustment of slide 88 defines the deflection of rocker arm 89, thereby determining the amount of accelerator displaced by linear piston 44 from cylinder 47. By adjustment of slide 38 with the aid of a spindle 59, this amount can be altered and thus adjusted to the particular delivery of concrete.

Figure 2:
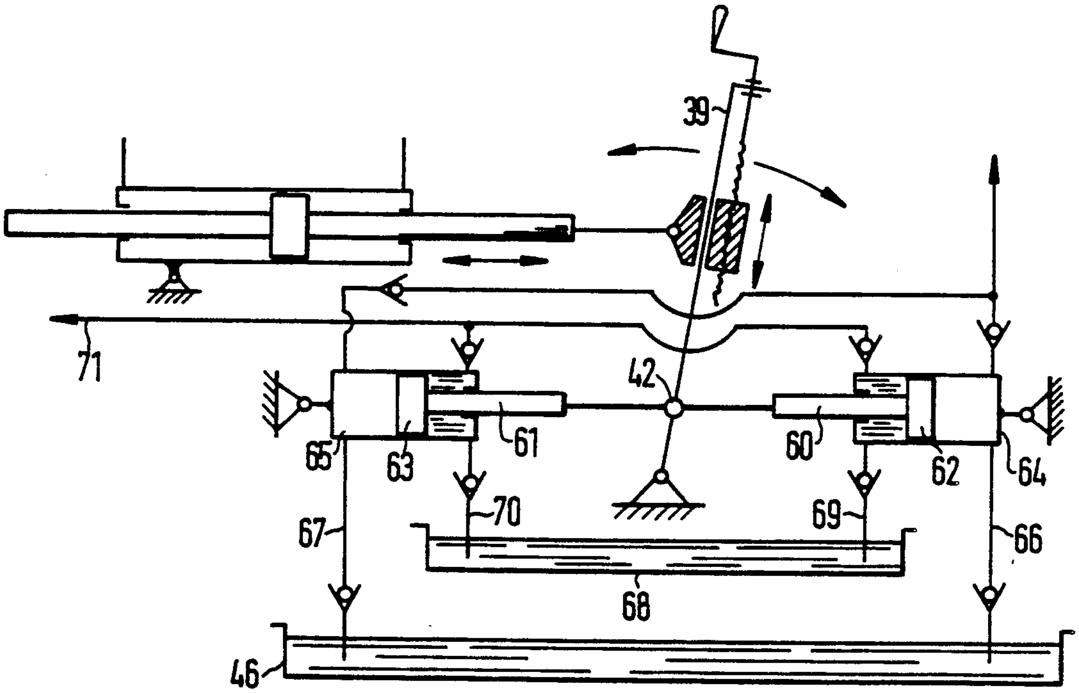
FIG. 2 shows a second embodiment of the invention, omitting the latter subassemblies.

In the embodiment of FIG. 2, piston rods 60, 61 are hinged at 42 to rocker 39. These piston rods are moved in opposite directions as soon as rocker 39 is driven in accordance with the arrow. Dosing pistons 62, 63 connected with piston rods 60 and 61 run in singleacting dosing cylinders 64, 65, analogously to the conditions of the arrangement of linear piston 44 (see above), taking the accelerator from tank 46 via suction pipes 66, 67 protected by check valves and feeding it to pipe 8 via directional valve 49 through branches protected by check valves (not shown).

However, the piston rod sides of cylinders 64, 65 are subjected to water from a supply tank 68 via legs 69 and 70 which are protected by check valves. During the return stroke of the piston, legs of a waste water pipe 71 are acted upon, in which check valves prevent waste water from being sucked in. This prevents caking of the accelerating additive.

In a branch of displacer circuit 31, a stopcock 72 is built in apart from branches 32, 33. In the closed blocked state this stopcock permits drive of displacer piston 34 via branches 32, 33, and in the open state it short-circuits branches 32, 33 so that no pressure can build up to drive displacer piston 34, which means that there is no feed of additive out of tank 46.

Although the present invention has been described with reference to preferred embodiments, workers skilled in the art will recognize that changes may be made in form and detail without departing from the spirit and scope of the invention.

What is claimed is:

1. An apparatus for pneumatically discharging concrete fed hydromechanically in a dense stream, using for the hydromechanical feed a concrete pump having a hydraulic drive comprising at least two cylinders with opposed reciprocating pistons, the reciprocating pistons being driven by a hydraulic working medium and the opposed pistons having synchronization control by a displacer circuit between the two cylinders, the displacer circuit reciprocally conducting the working medium displaced by an advancing piston of one cylinder and discharging the working medium to the other cylinder, and having a dosing means for an additive serving as an accelerating agent, the dosing means being operated in association with the hydraulic drive of the concrete pump, characterized in that the dosing means is operated by a reciprocating piston drive (34) connected to the displacer circuit to provide hydraulic working medium from the concrete pump to reciprocally operate the piston drive, wherein the volume of working medium absorbed by the reciprocating piston drive in both directions corresponds to the amount of hydraulic working medium displaced from one cylinder by the advancing piston, the absorbed amount being added in both directions to the other cylinder.

2. The apparatus of claim 1, characterized in that the drive of the dosing means is a linear piston drive.

3. The apparatus of claim 1, characterized in that the dosing means is a linear reciprocating pump.

4. The apparatus of claim 3, characterized in that the linear piston drive of the dosing means and the linear reciprocating pump thereof are hinged to a rocker arm, one of the hinges being effected by an adjustable slide which serves to adjust the amount of additive.

5. The apparatus of claim 1, characterized in that the accelerating agent is fed by the dosing means to a feed pipe for discharge, the feed of the accelerating agent by the dosing means to the feed pipe being controlled by a directional control valve.

6. The apparatus of claim 1, characterized in that the dosing means comprises a reciprocating pump having two opposed single-acting differential cylinders whose cylinder spaces free of additive are connected by suction pipes with a fresh-water tank out of which fresh water is fed into a waste water pipe for rinsing the walls of the cylinders.

7. The apparatus of claim 5 wherein the directional control valve also discharges the accelerating agent to a tank.

8. The apparatus of claim 7 wherein the directional control valve operates between the feed pipe and the tank in association with the hydraulic drive of the concrete pump a spring designed to react to the pressure developed by the hydraulic working medium.

* * * * *

UNITED STATES PATENT AND TRADEMARK OFFICE
CERTIFICATE OF CORRECTION

PATENT NO. : 5,066,203

DATED : November 19, 1991

INVENTOR(S) : Joachim Coja et al.

It is certified that error appears in the above-identified patent and that said Letters Patent is hereby corrected as shown below:

Title page:

Item [75] Inventors, delete "Andre j." and insert --Andrej--.

Col. 6, line 38, after "pump", insert --by--.

Signed and Sealed this

Twenty-third Day of March, 1993

*Attest:*

STEPHEN G. KUNIN

*Attesting Officer*

*Acting Commissioner of Patents and Trademarks*